(12) United States Patent
Takikawa et al.

(10) Patent No.: US 6,534,195 B1
(45) Date of Patent: Mar. 18, 2003

(54) CONNECTION STRUCTURE FOR METALLIC MEMBERS AND CONNECTING METHOD THEREFOR

(75) Inventors: Kazunori Takikawa, Wako (JP); Masayuki Narita, Wako (JP)

(73) Assignees: Honda Giken Kogyo Kabushiki Kaisha, Tokyo (JP); Yachiyo Kogyo Kabushiki Kaisha, Saitama (JP)

( * ) Notice: Subject to any disclaimer, the term of this patent is extended or adjusted under 35 U.S.C. 154(b) by 0 days.

(21) Appl. No.: 09/784,454

(22) PCT Filed: Jun. 30, 2000

(86) PCT No.: PCT/JP00/04350

§ 371 (c)(1),
(2), (4) Date: Jun. 11, 2001

(87) PCT Pub. No.: WO01/02121

PCT Pub. Date: Jan. 11, 2001

(30) Foreign Application Priority Data

Jun. 30, 1999 (JP) ............................................ 11-185647

(51) Int. Cl.⁷ ............................ B32B 15/01; B23K 1/06
(52) U.S. Cl. ..................... 428/646; 148/516; 148/528; 228/111.5; 228/200; 228/225; 228/226; 228/262.9; 428/658; 428/926
(58) Field of Search ................................ 428/646, 658, 428/926; 148/516, 528; 228/111.5, 200, 225, 226, 262.9

(56) References Cited

U.S. PATENT DOCUMENTS 5,553,640 A    9/1996   Ferenczy et al.

FOREIGN PATENT DOCUMENTS

EP    0 700 239 A1    3/1996

OTHER PUBLICATIONS

Patent Abstracts of Japan, Publication No. 10–071488, published Mar. 17, 1998.
Patent Abstracts of Japan, Publication No. 09–001381, published Jan. 7, 1997.
Patent Abstracts of Japan, Publication No. 11–114667, published Apr. 27, 1999.

*Primary Examiner*—Robert R. Koehler
(74) *Attorney, Agent, or Firm*—Arent Fox Kintner Plotkin & Kahn, PLLC

(57) ABSTRACT

Sn—Zn alloy is plated on at least one of a first metallic member and a second metallic member, Sn—Ag alloy is used as a solder, the first metallic member and the second metallic member are connected by the solder, and a connection structure of metallic members is therefore produced. Heat degradation of plating and the contact corrosion between solder and plating can thereby be prevented, solderability can be improved, and qualities such as corrosion resistance and connecting strength at the connection structure can be improved.

16 Claims, 6 Drawing Sheets

Fig. 3
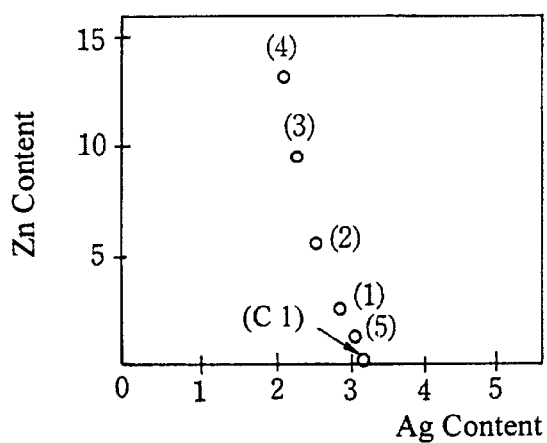
Fig. 4
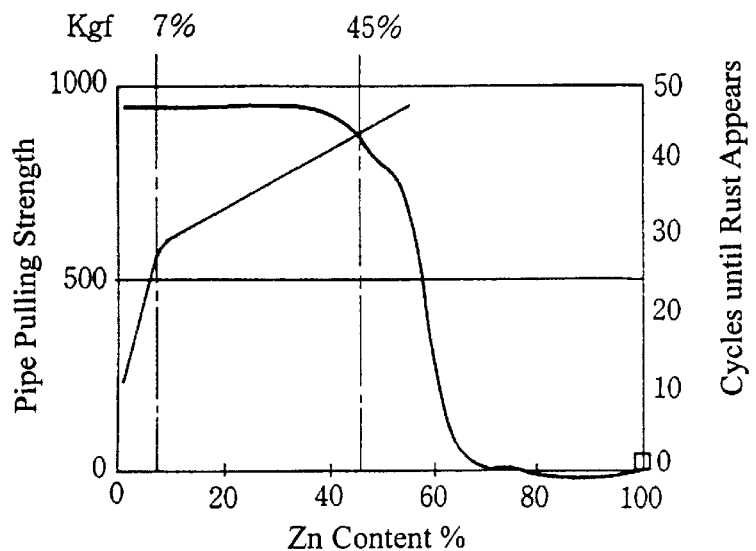
Fig. 5A  Fig. 5B  Fig. 5C
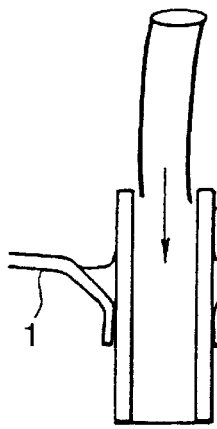
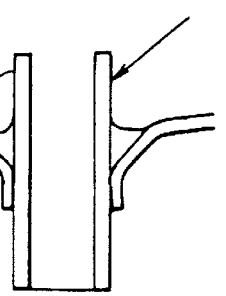
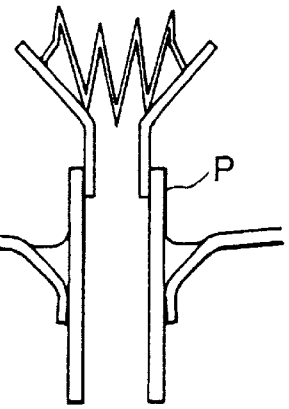

CONNECTION STRUCTURE FOR METALLIC MEMBERS AND CONNECTING METHOD THEREFOR

TECHNICAL FIELD

The present invention relates to a connection structure for metallic members, which is, for example, suitable as a connection structure between a tank and a pipe of a fuel tank for automobiles, etc., and in particular, relates to a technique in which corrosion resistance and sealing can be improved without using Pb.

BACKGROUND ART

For example, in a fuel tank 1 for automobiles, as shown in FIG. 10, pipes such as a filler neck pipe 2 for refueling, a breather pipe 3 for breathing air in refueling, and a venting pipe 4 for releasing pressure in the fuel tank 1, are connected. In the case in which such pipes are connected to the fuel tank 1, one end of a pipe P is press-fitted in the fuel tank 1, as shown in FIG. 11, then ring shaped solder S is adjacently placed at a boundary between the pipe P and the fuel tank 1, and this solder S is heated and melted by an electrode 6 for high frequency induction heating. Then, the melted solder S solidifies at the corner portion of the boundary between the pipe P and the fuel tank 1, as shown in FIG. 12, and both members are thereby airtightly connected.

As a conventional solder, Pb—Sn alloy has generally been employed. However, it is not desirable to use Pb since there are environmental regulations on Pb leached from industrial waste such as shredder dust, etc., and substitutes for Pb have been required. Therefore, Ag alloys, Cu or Cu—Zn based alloys, Zn—Al alloys, etc., have recently been used, and in Japanese Unexamined Patent Publication No. 71488/98, a Sn alloy solder (Sn—Ag based) has also been disclosed.

On the other hand, as a material for fuel tanks and pipes, surface treated steel sheets which are subjected to Zn plating, Al alloy plating, Zn alloy plating, etc., may be used. Alternatively, after-treatment plating which is carried out after material is processed from a steel plate, may be carried out. In any case, a fuel tank 1 and a pipe P on which are formed platings M1 and M2, are connected together by solder S, as shown in FIG. 12. The solder S is applied to such connections since the heating temperature thereof is lower than those of other methods such as welding, etc., the heat distortion at a position where dimensional accuracy is required can be suppressed in a thin layer, the sealing thereof is superior, equipment can be miniaturized, etc.

In a fuel tank for automobiles, seals which can withstand high internal pressure are required at soldered portions since internal vapors of fuel expand with increasing temperature, and in addition, reliability and durability in which functions thereof are not damaged by vibration and acceleration during driving of the automobile, are also required. The fuel tank is often installed under the floor of the car body, and therefore, a high level of coating and high corrosion resistance are required, even at the soldered portions, since they are exposed to severe road environments and climatic conditions, such as snowmelt salt, mud, water, humidity, are splashed gravel. Furthermore, corrosion resistance of the inner surface is also required, since corrosive components such as acids and peroxides are produced when gasoline decomposes in a fuel tank.

However, there was a problem in that surrounding plating is heated by heating during soldering, and the plating is thereby heat-deteriorated. That is, it is necessary to heat to a temperature 50° C. or more (preferably 100° C.) higher than the melting point of solder, in order to securely fix members by increasing the solderability (wettability). In particular, a pipe wall portion just above a high frequency heating electrode is heated to a high temperature by this heating and plating metal is alloyed with Fe material, and the corrosion resistance is thereby lowered and the plating is weakened thereby. Depending on conditions, a plating M2 may melt and flow down, as shown in FIG. 13(a), or a porous oxide film M3 may be formed by oxidizing the plating M2, as show in FIG. 13(b), and corrosion resistance is thereby drastically lowered, and the application property is also lowered in the latter case.

In addition, in the case in which the solder material is different from the plating material, there was a problem in that the corrosion resistance is lowered by contact corrosion occurring in which the base metal acts as an anode. Therefore, it is an object of the present invention to provide a connection structure for metallic members and a connecting method in which high reliability and high durability can be ensured even in use under severe conditions. Specifically, in the present invention, plating and solder materials are selected in consideration of following points.

1̂ A solder having superior solderability to plating is selected in order to obtain a connection structure having superior qualities in which a soldered portion thereof has high strength and there are few internal defects.

2̂ Materials for the solder and the plating having small differences in corrosion potential are selected in order to reduce contact corrosion between the solder and the plating.

3̂ A plating having high corrosion resistance to saltwater or decomposed gasoline is selected in order to improve the corrosion resistance of the plating.

4̂ A solder having a low melting point is selected in order to reduce heat deterioration of the plating caused by heating during soldering and to increase thereby adhesion of films. In particular, it is desirable that melting points of the solder and the plating be 180° C. or more in view of the fact that baking finishing is carried out at 150° C. or more in a subsequent process.

DISCLOSURE OF THE INVENTION (1) Prevention of Heat Deterioration of Plating

The present inventors researched materials for plating and solder from the above points of view. Firstly, melting points of various alloys or metals were enumerated in the following, in order to take into account the heat deterioration prevention of the plating. In comparison with properties shown in Table 1, Zn to Cu—Zn based alloy (lines 6 to 10) have high melting points, and it is therefore anticipated that heat deterioration, such as oxidation, etc., of the plating material (Pb—Sn alloy, etc.) will occur.

TABLE 1

| Alloy Names | Symbols | Melting Points | Primary Uses | Evaluation |
|---|---|---|---|---|
| Lead-tin alloy | Pb—Sn | 200 | Soldering, Plating | Good |
| Tin-silver alloy | Sn—Ag | 215 | Soldering | Good |
| Tin-antimony alloy | Sn—Sb | 220 | Soldering | Good |
| Tin-zinc alloy | Sn—Zn | 230 | Plating | Good |
| Zinc | Zn | 420 | Plating | Bad |
| Zinc-aluminum alloy | Zn—5Al | 361 | Soldering, Plating | Bad |
| Aluminum-silicone alloy | Al—Si | 585 | Plating | Bad |
| Silver-copper alloy | Ag—Cu | 780 | Brazing | Bad |
| Copper-zinc alloy | Cu—40Zn | 890 | Brazing | Bad |

(2) Corrosion Resistance of Plating

In a fuel tank for automobiles, corrosion resistance to the external environment and corrosion resistance to acids and peroxides produced by the degradation of fuel are required. Then, with respect to the internal corrosion resistance which prevents Fe in a saltwater environment from causing corrosion and the external corrosion resistance which has resistance to gasoline degradation products including formic acid or acetic acid, the evaluations of various metals are described in Table 2. As is apparent from Table 2, Al—Si alloy and Sn—Zn alloy are preferable as a plating material.

TABLE 2

| | Plating Metal | | | | | | |
|---|---|---|---|---|---|---|---|
| | Zn | Zn—Ni | Al—Si | Sn—Zn | Sn | Cu | Ag |
| Internal corrosion resistance | Bad | Average | Good | Good | Bad | Bad | Bad |
| External corrosion resistance | Bad | Bad | Good | Good | Good | Bad | Good |

(3) Contact Corrosion Resistance and Solderability

The order of corrosion potential of various metals in a saltwater is shown in FIG. 1. In the case in which two metals shown in FIG. 1 are employed for soldering and plating, if the locations of the corrosion potential of the two metals are far apart, the difference in the corrosion potentials is high, and the base metals are easily corroded. According to this rule as a standard, the contact corrosion resistances of the combinations of various metals were evaluated and the results are shown in Table 3. Additionally, with respect to each combination of metals, the solderabilities thereof were also evaluated. In this evaluation, the following criteria were used: cases where the solderability thereof was the same as that of combination of Pb—Sn alloy plating and Pb—Sn alloy solder are indicated by ○, cases where it was slightly inferior to the above, but was at an allowable level are indicated by Δ, and cases where soldering thereof was difficult or impossible are indicated by ×, and these results are shown in Table 3.

TABLE 3

| Solder \ Plating | Sn-Zn alloy | Zn alloy | Al alloy |
|---|---|---|---|
| Cu—Cu alloy | ○ / × | ○ / × | Δ / × |
| Ag alloy | ○ / × | ○ / × | Δ / × |
| Sn—Ag alloy | ○ / Δ | Δ / Δ~× | × / × |
| Sn—Zn alloy | Δ~× / ○ | × / Δ | × / Δ |

Solderability / Contact Corrosion Resistance

As is apparent from Table 3, the combination of Sn—Zn alloy plating and solder was best in the contact corrosion resistance. However, this combination has inferior solderability and would be difficult to use in practice because zinc oxide is a product on the surface of melted metal in soldering. In contrast, the combination of Sn—Ag alloy solder and Sn—Zn alloy plating has superior solderability, and the contact corrosion resistance is also at an allowable level. In addition, these alloys also have low melting points and superior internal and external corrosion resistances.

Therefore, the present invention has been made based on the above tests and is characterized in that in a connection structure for metallic members in which a first metallic member and a second metallic member are connected by solder, Sn—Zn alloy is plated on at least one of the first and second metallic members, and the solder consists of Sn—Ag alloy.

In the connection structure for the metallic member as composed above, solder and plating easily melt each other since the melting points thereof are close, and thus, the solderability is superior, the number of internal defects is small, and the metallic members are firmly adhered. A seal which resists high internal pressure in the interior of a fuel tank and which has reliability and durability and are not damaged by vibration and acceleration in the driving of automobiles can thereby be obtained. In contrast, in the case in which the difference between the melting points of solder and plating is large, it is necessary to conform the heating temperature to a higher melting point. Therefore, the metal having a lower melting point is oxidized by heating and oxide film is formed, and Fe, which is base, is thereby easily corroded and the adhesion of the films is decreased. However, such problems do not occur in the present invention. Additionally, the internal corrosion resistance and the external corrosion resistance are superior since the plating consists of Sn—Zn alloy, and generation of contact corrosion is also reduced since differences in corrosion potentials are small.

Here, a Zn-rich layer in which Sn—Zn alloy plating is alloyed with the solder is desirably provided on the surface of a portion of which the solder and the plating melt with each other. By providing the Zn-rich layer, contact corrosion between the plating and the solder is prevented, and a chemical conversion coating is easily formed in pre-treatment processing and the adhesion of films is thereby improved.

In addition, the Sn—Zn alloy plating desirably has a composition of 93 to 55% by weight of Sn and 7 to 45% by weight of Zn. When the content of Zn is below 7% by weight, the amount of Zn to prevent corrosion of Fe is low, and Fe is thereby easily corroded, and the corrosion resistance in a saltwater environment is decreased. In contrast, when the content of Zn exceeds 45% by weight, Zn oxide in a porous state is formed on the surface of a portion of which the solder and the plating melt with each other. Therefore, the solderability deteriorates and the fastening strength is decreased.

Furthermore, a connecting method for metallic members, according to the present invention, is characterized in that a connecting method for metallic members in which a first metallic member and a second metallic member are connected by solder, comprises plating Sn—Zn alloy on at least one of the first and second metallic members, using Sn—Ag alloy as a solder, and connecting the metallic members while cooling at the connected portion. According to the present invention, formation of porous layers by washing away the plating due to overheating or by oxidation thereof can be reliably prevented. In particular, when one metallic member is a hollow member such as a pipe, a moderate suitable cooling effect can be obtained preferably by supplying cooling gas such as air or other gas into the inside of the hollow member. In addition, the soldering conditions have been controlled by electric power supplied to an electrode for high frequency heating heretofore. However, electric power control has recently been further expanded by further adding cooling thereto, and the control has become easy and the quality thereof has also been stabilized.

BRIEF DESCRIPTION OF THE DRAWINGS

FIG. 3 is a graph showing relationships between Zn content and Ag content on the surface of a soldered portion.

FIG. 4 is a graph showing relationships between Zn content, the pipe pulling strength, and the rust occurrence cycle, respectively.

FIGS. 5A to 5C are longitudinal sectional views showing cooling methods for soldered portions, respectively.

BEST MODE FOR CARRYING OUT THE INVENTION

Next, the present invention is explained referring to FIG. 2 in more detail. As shown in FIG. 2A, a fuel tank or container 1 (first metallic member) has Sn—Zn alloy plating M1 plated on the internal and external surface of raw material 1a made of Fe. In this fuel tank 1, a pipe (second metallic member) P in which Sn—Zn alloy plating M2 is plated on the internal and external surfaces is inserted under pressure. In the figures, description of internal plating is omitted. A ring of solder S is fitted on the pipe P, and the solder S is heat-melted by an electrode for high frequency heating (not shown) displaced in close to the solder S. FIGS. 2B and 2C show conditions in which the solder S is solidified. As shown in FIG. 2C on the surface of the solder S, the plating M1 and the plating M2 are alloyed to the solder S, and a Zn-rich layer R is formed. Next, as If shown in FIG. 2D, the fuel tank 1 and the pipe P are coated, preferably after carrying out the pretreatment process, and they are covered with a coating film C. In such a connection structure for metallic members, the contact corrosion between the plating and the solder is prevented since the Zn-rich layer R is formed on the surface of the solder S. and the adhesion of films is superior because a chemical conversion coating is easily formed in the pre-treatment process. Therefore, the corrosion resistance on the surface of the solder S can be drastically improved.

As a solder according to the present invention, a solder consisting of 94 to 98% by weight of Sn and 2 to 6% by weight of Ag is preferable, and third addition metals such as Zn, Cu, and Bi may be contained in an amount below 3% by weight. Furthermore, the present invention is achieved-by Sn—Zn alloy plating being plated on at least one of the first and second metallic members. With respect to the other metallic member, Ni plating may be plated thereon instead of the Sn—Zn alloy plating, or nothing may be plated thereon. It is desirable that the content of Zn in the Sn—Zn alloy plating be 7 to 45% by weight. When the content of Zn is below 7% by weight, the amount of Zn for preventing corrosion of Fe is small, and Fe is thereby easily corroded and the corrosion resistance in a saltwater environment is decreased. In contrast, when the content of Zn exceeds 45% by weight, Zn oxide in a porous state is formed at regions shown by symbol Z in FIG. 2C of the solder S. Therefore, the solderability is deteriorated and the fastening strength is decreased. Additionally, the thickness of the Sn—Zn alloy plating is desirably 3 to 13 μm. Furthermore, if a chromate-treated film, an organic coating film having a thickness of 1 μm or less, or an inorganic composite coating film is provided on the surface of the Sn—Zn alloy plating, the corrosion resistance is further improved.

EXAMPLES

In the following, the present invention is explained referring to Examples in more detail.

1. First Embodiment

A. Preparation of Samples

Figure 13A:
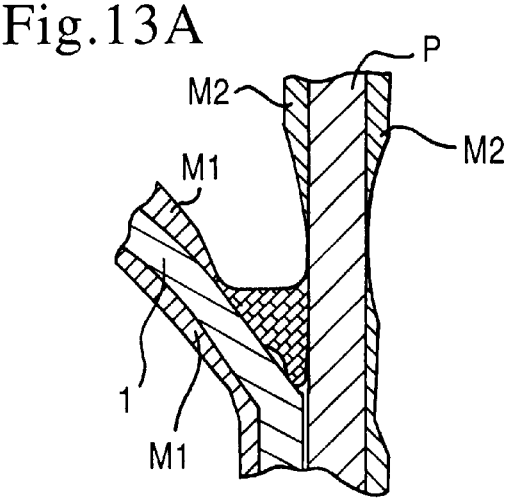
FIGS. 13A and 13B are longitudinal sectional views showing inferior qualities which occur in soldered portions.
Figure 13B:
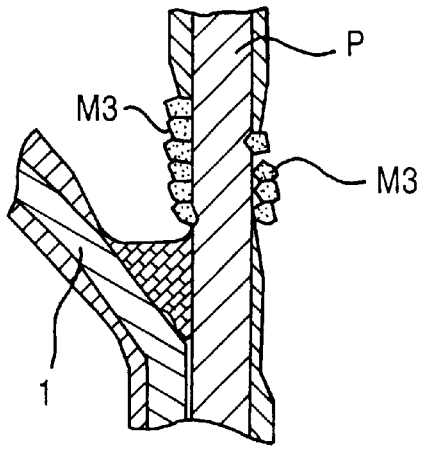

A steel pipe (member A) having an outer diameter of 16 mm and an inner diameter of 14 mm in which Sn—Zn alloy plating or Ni plating was plated on the internal and external surfaces and a steel plate (member B) having a thickness of 1 mm in which Sn—Zn alloy plating was plated on the surface and the rear surface thereof, were prepared. A connection structure of the Example, as shown in FIG. 13, was obtained by making a hole on the steel plate, inserting the pipe into the hole under pressure, and connecting together using a ring of Sn—Ag alloy solder. In addition, a connection structure of the Comparative Example was obtained in the same manner as that of Example, except that the plating components of the members A and B were changed into a component other than Sn—Zn alloy. Each connection structure was coated all over the surface so as to have a thickness of 20 μm. The types of solder and plating and contents of Ag and Zn (% by weight) in each connection structure are described in Table 4.

TABLE 4

|  | Solder | Member A | Member B |
| --- | --- | --- | --- |
| Example 1 | Sn—Ag (Ag: 3.5%) | Sn—Zn (Zn: 7%) | Sn—Zn (Zn: 7%) |
| Example 2 | Sn—Ag (Ag: 3.5%) | Sn—Zn (Zn: 30%) | Sn—Zn (Zn: 8%) |
| Example 3 | Sn—Ag (Ag: 3.5%) | Sn—Zn (Zn: 30%) | Sn—Zn (Zn: 30%) |
| Example 4 | Sn—Ag (Ag: 3.5%) | Sn—Zn (Zn: 45%) | Sn—Zn (Zn: 45%) |
| Example 5 | Sn—Ag (Ag: 3.5%) | Ni | Sn—Zn (Zn: 8%) |
| Example 6 | Sn—Ag (Ag: 3.5%) | Sn—Zn (Zn: 55%) | Sn—Zn (Zn: 55%) |
| Comparative Example 1 | Sn—Ag (Ag: 3.5%) | Ni | Ni |
| Comparative Example 2 | Sn—Ag (Ag: 3.5%) | Zn | Zn—Ni |

B. Test

With respect to each connection structure, a combined corrosion test based on automobile standard (JASOM 610-92) was carried out and the corrosion resistance thereof was examined. In this combined corrosion test, 1̂ NaCl aqueous solution at 35° C. was sprayed on the connection structure for 2 hours, 2̂ this was dried for 4 hours in air at 60° C. and a relative humidity of 20 to 30%, and 3̂ this was left for 2 hours in a moist environment at 50° C. and a relative humidity of over 95%. The process of 1̂ to 3̂ was defined as 1 cycle, and the number of cycles until red rust was generated at the connection structure was counted.

Figure 12:
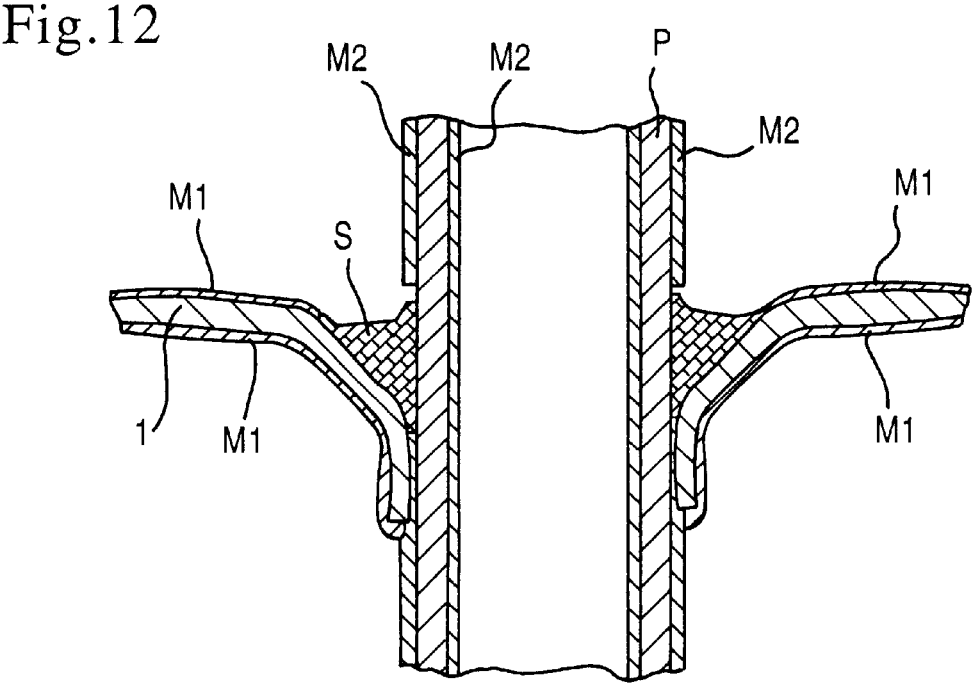
FIG. 12 is a longitudinal sectional view showing a soldered portion in detail.

The pipe was pulled out upward of the steel plate in the state shown in FIG. 12, and the pulling load of the pipe was measured. Additionally, each condition of the solder before coating was observed by visual observation, and the solderability thereof was evaluated. The above results are described in Table 5. In the evaluation of the solderability, the following criteria were used: cases where it had the same solderability as that of a combination of Pb—Sn alloy plating and Pb—Sn alloy solder which is most generally used are indicated by ⊚, cases where it was slightly inferior to the above, but was preferable are indicated by ○, cases where it was inferior, but was at an allowable level are indicated by Δ, and cases where soldering thereof were unacceptable are indicated by ×.

TABLE 5

|  | Zn Content (wt %) | | Pipe Pulling | | Corrosion Resistance |
| --- | --- | --- | --- | --- | --- |
|  | Member A | Member B | Load (kgf) | Solderability | (Number of Cycles until Rust Appears) |
| Example 1 | 7 | 8 | 955 | ⊚ | 22 |
| Example 2 | 30 | 8 | 953 | ⊚ | 26 |
| Example 3 | 30 | 30 | 948 | ⊚ | 34 |
| Example 4 | 45 | 45 | 880 | ○ | 42 |
| Example 5 | 0 | 8 | 950 | ⊚ | 20 |
| Example 6 | 55 | 55 | 600 | Δ | 47 |
| Comparative Example 1 | 0 | 0 | 950 | ⊚ | 10 |
| Comparative Example 2 | 100 | 94 | 20 | X | 5 |

As is apparent from Table 5, in connection structures of Examples 1 to 3, high pulling loads of about 950 kgf were exhibited and the corrosion resistances were also superior, since the solderabilites were superior. In Examples 4 and 6, since the content of Zn in Sn—Zn alloy plating was relatively high, oxides of Zn were produced between solder and plating during plating, the solderabilities and the pipe pulling loads were slightly decreased, but there was no problem in practical use. Furthermore, in Example 5, since the plating of member A consists of Ni in which the corrosion of Fe cannot be prevented, that is, in which it is a noble metal in comparison with Fe, the corrosion resistance was slightly decreased, but there was no problem in practical use. In Comparative Example 1, the plating did not melt during soldering since it was Ni in which the melting point is high, and superior solderability and superior pipe pulling load were exhibited. However, the corrosion resistance of Comparative Example 1 was inferior, since the platings of both members thereof consisted of Ni. In addition, in Comparative Example 2, since the content of Zn in the plating was high, the oxide of Zn was formed in the porous state at an alloy layer between solder and plating, and the solderability was extremely deteriorated. Furthermore, in Comparative Example 2, the platings of member A and member B consisted of Zn and Zn-Ni for which the order of corrosion potential is quite different. Therefore, contact corrosion was generated between the plating and the members, and the corrosion resistance was more inferior.

FIG. 3 is a graph showing relationships between Zn content and Ag content on the surface of a soldered portion in Examples 1 to 5 and Comparative Example 1. As is apparent from FIG. 3, the larger the Zn content in the plating, the more Zn-rich the Zn layer formed on the surface of Sn—Ag alloy solder. Thus, by this Zn-rich layer, contact corrosion between plating and solder is suppressed and film adhesion is improved, and the superior corrosion resistance, as described above, can thereby be obtained.

2. Second Embodiment

Connection members in which each Zn content was gradually made to change from 0 to 100% by weight were produced in the same manner as the above first embodiment, except for using members A and B plated with Sn—Zn alloy having the same Zn content. Next, the pipe pulling load of each connection material was measured, and the results are shown in FIG. 4. As is apparent from FIG. 5, the larger the Zn content, the larger the pipe pulling load; however, the pipe pulling load is rapidly decreased if Zn content exceeds 45% by weight. This occurs because the Zn oxide in a fragile porous state is formed at the alloy layer between solder and plating. As is apparent from this result, it is preferable that the Zn content in the plating be below 45% by weight.

In addition, with respect to connection structures in which the Zn content in the plating ranges from 0 to 55% by weight, a combined corrosion test was carried out under the same conditions as that of the first embodiment, and the results are described in FIG. 4. As is apparent from FIG. 4, when the Zn content is below 7% by weight, the corrosion prevention function of Zn cannot be obtained, and the corrosion resistance is rapidly decreased. Therefore, it is preferable that the Zn content in the plating be 7% by weight or more.

3. Third Embodiment

FIGS. 5A to 5C are drawings showing soldering methods while the pipe is cooled; FIG. 5A shows a method for cooling the inside of the pipe using a coolant, FIG. 5B shows a method for cooling the outside of the pipe using a coolant, and FIG. 5C shows a method for dissipating and radiating heat by providing radiating fins on the top of the pipe. A connection structure was produced in the same manner as in Example 3 in the above first embodiment in addition to using the cooling methods shown in FIGS. 5A to 5C. Then, the cooling effects were examined by measuring the temperature at the position shown in FIG. 6 in the connection structure, the quality (solderability) and the corrosion resistance at the soldered portion were tested by the same method as that of the first embodiment, and the results are shown in Table 6.

TABLE 6

| | Cooling Methods | | | | | |
| --- | --- | --- | --- | --- | --- | --- |
| | (a) Pipe Inside Cooling | | | (b) Pipe Outside Cooling | | (c) Fin Cooling |
| | Coolant | | | | | |
| | a-1 Air or Gas | a-2 Water | a-3 Steam or Water Mist | b-1 Air or Gas | b-2 Steam or Water Mist | f Nothing |
| Cooling Effect | ○ | ⊚ | ⊚ | ⊚ | ⊚ | X |
| Solder Quality | ⊚ | X | X | X | X | — |

TABLE 6-continued

| | Cooling Methods | | | | | |
|---|---|---|---|---|---|---|
| | (a) Pipe Inside Cooling | | | (b) Pipe Outside Cooling | | (c) Fin Cooling |
| | Coolant | | | | | |
| | a-1<br>Air or Gas | a-2<br>Water | a-3<br>Steam or<br>Water Mist | b-1<br>Air or Gas | b-2<br>Steam or<br>Water Mist | f<br>Nothing |
| Corrosion<br>Resistance | ⊙ | — | — | — | — | Δ<br>(Conventional<br>Property) |
| Total Evaluation | ⊙ | X | X | X | X | X |

As shown in Table 6, in the cooling methods of (a-2) and (a-3) overcooling was caused, and incomplete penetration thereby occurred, in particular, at the interface of pipe and solder, and satisfactory solder qualities were not obtained. In addition, in the cooling method of (b-1), wavy folds due to the coolant were caused on the surface of unsolidified solder, and in the cooling method of (b-2), cracks due to quenching were generated on the surface of the solder, and satisfactory solder qualities were not obtained. Furthermore, in the cooling method of (c) which did not use the coolant, a sufficient effect for controlling temperature rise was not obtained. Ultimately, the pipe internal cooling (a-1) using air or gas as a coolant was most preferable since a moderate cooling effect was obtained.

Figure 1:
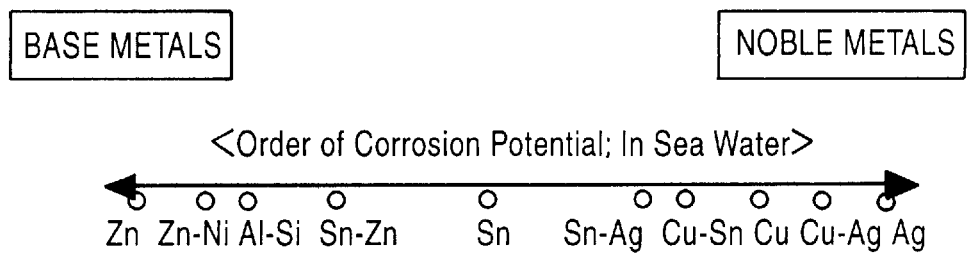
FIG. 1 is a drawing showing the order of corrosion potential with respect to various metals.
Figure 2A:
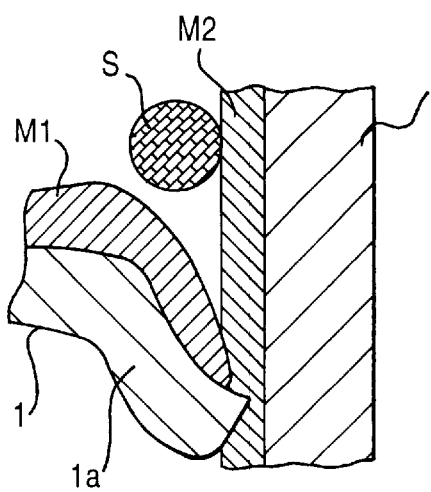
FIGS. 2A to 2D are cross sectional views showing soldered portions in detail.
Figure 2B:
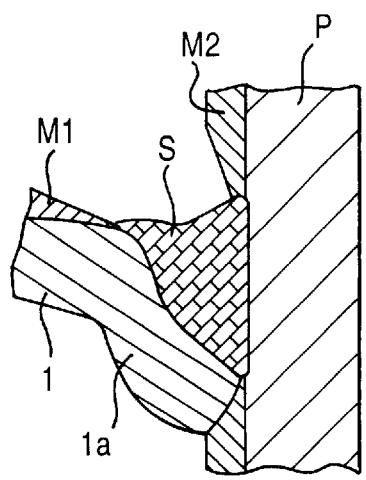
Figure 2C:
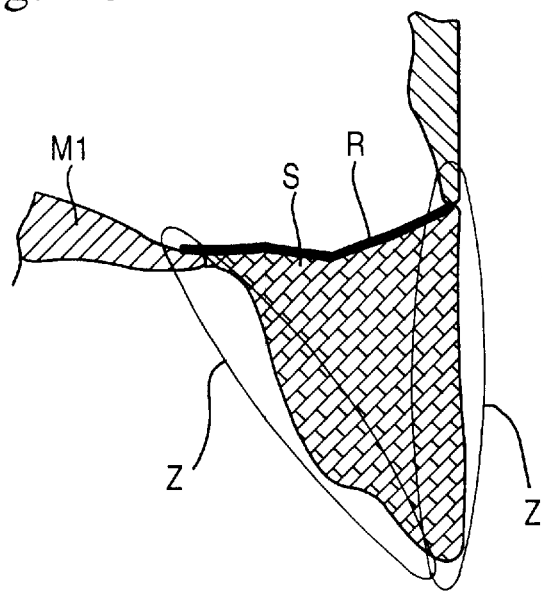
Figure 2D:
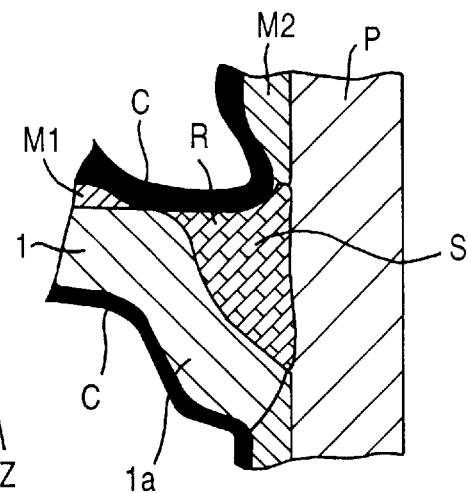
Figure 6:
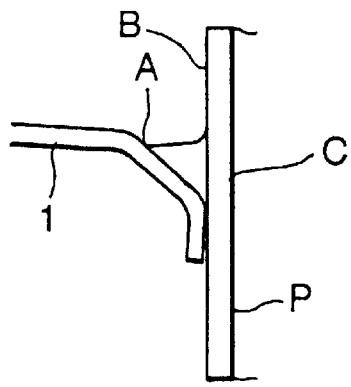
FIG. 6 is a longitudinal sectional view showing temperature measuring points in a soldered portion.
Figure 7:
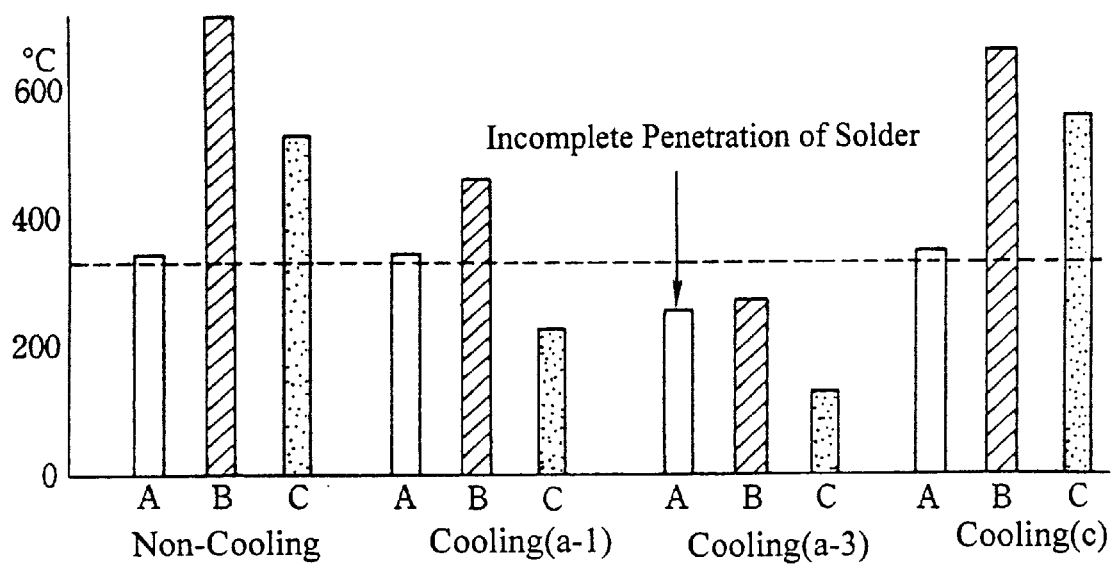
FIG. 7 is a graph showing temperatures of each point in a soldered portion.

FIG. 7 is a graph showing temperatures of each position (A, B, and C) shown in FIG. 6 in the cooling methods of (a-1), (a-3), and (c). In addition, the temperature in the case of non-cooling was also described as a control. As shown in FIG. 7, in the cooling method of (a-3), the temperature at point A was lowered below the required heating temperature (about 340° C.) by overcooling, and the incomplete penetration of solder thereby occurred. Furthermore, in the cooling method of (c), there was little difference in temperature from the case of non-cooling.

Next, combinations of solder and plating shown in Table 7 were soldered, except that cooling methods were changed and connection structures were thereby produced. Then, variously properties of produced connection structures were tested, and the results are also described in Table 7. Here, an epoxy-type or melamine-type coating material was coated on the connection structure after soldering, so as to have a thickness of about 20 μm, it was dried for a standard time, and the coating was thereby formed. In addition, the coating was soaked in ion exchanged water at 40° C. for 240 hours and was taken out, cross cut patterns 1 by 1 mm were scored on the surface of pipe by knife, and the film adhesion was evaluated by peeling cellophane tape from the cross cut patterns. Furthermore, in the evaluation, the following criteria were used: cases where the peeling area of each cross cut pattern was 50% or less per one cross cut pattern area, and all of the cross cut pattern satisfied the above range are indicated by ○, and cases other than the above cases are indicated by X. "Plating corrosion resistance" indicates the number of cycles in the combined corrosion test before painting, and "coating corrosion resistance" indicates the number of cycles in the combined corrosion test after painting.

TABLE 7

| Plating | Solder | Cooling<br>Methods | Pipe Pulling<br>Strength (kgf) | Solderability | Plating<br>Corrosion<br>Resistance | Film<br>Adhesion | Coating<br>Corrosion<br>Resistance |
|---|---|---|---|---|---|---|---|
| Pb—Sn | Pb—Sn | Nothing | 880 | ⊙ | 3 | X | 22 |
| Pb—Sn | Pb—Sn | a-1 | 870 | ⊙ | 6 | ○ | 42 |
| Pb—Sn | Pb—Sn | a-3 | 877 | X | — | — | — |
| Sn—Zn | Sn—Ag | Nothing | 950 | ⊙ | 8 | X | 24 |
| Sn—Zn | Sn—Ag | a-1 | 955 | ⊙ | 16 | ○ | 60 |
| Sn—Zn | Sn—Ag | a-3 | 947 | X | — | — | — |
| Zn | Sn—Ag | Nothing | 948 | Δ | 7 | X | 34 |
| Zn | Sn—Ag | a-1 | 950 | Δ | 16 | ○ | 50 |

As is apparent from Table 7, in the case in which Sn—Zn alloy was used for plating and Sn—Ag alloy was used for soldering in the cooling method of (a-1), extremely superior results were obtained in all properties. In particular, it was proven that the pipe pulling strength, the plating corrosion resistance, and the coating corrosion resistance were more superior to the case in which Pb—Sn was used for plating and soldering in the cooling method of (a-1).

Figure 8:
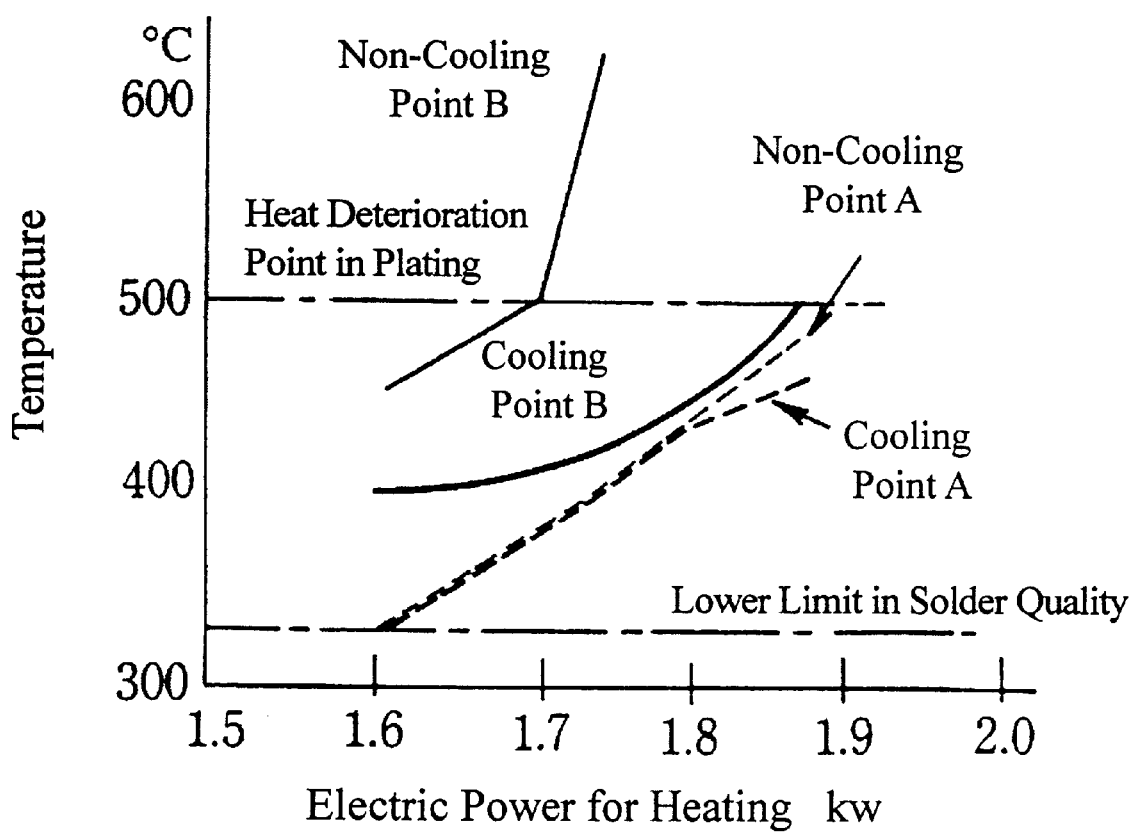
FIG. 8 is a graph showing relationships between electric power during heating and temperatures in a soldered portion or a plated portion.
Figure 9:
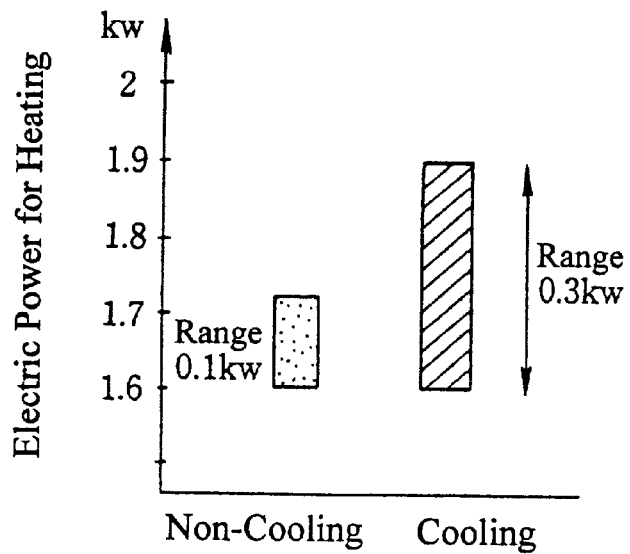
FIG. 9 is a graph showing controlling ranges of electric power for heating in the case in which a soldered portion is cooled and the case in which it is not cooled.
Figure 10:
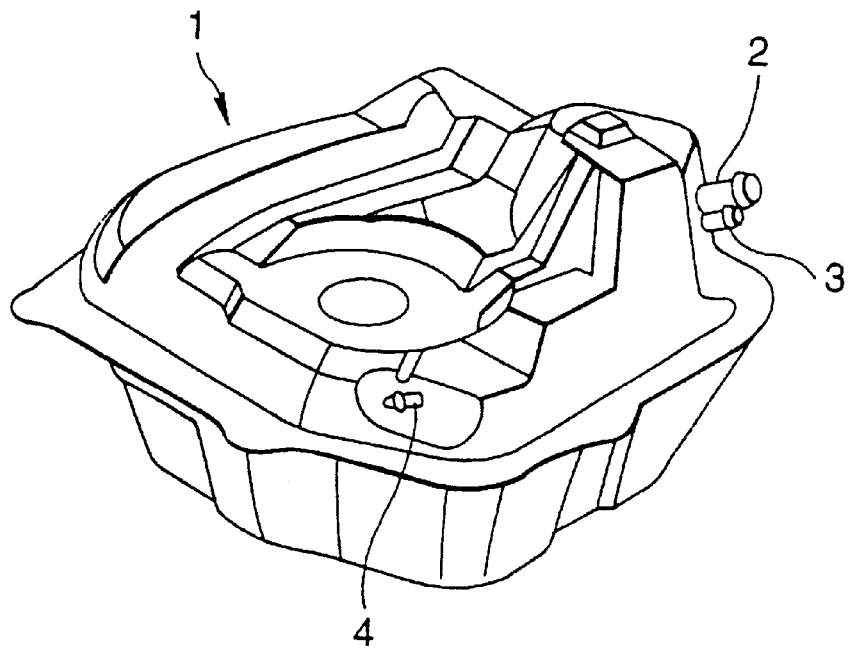
FIG. 10 is a perspective view showing a fuel tank.
Figure 11:
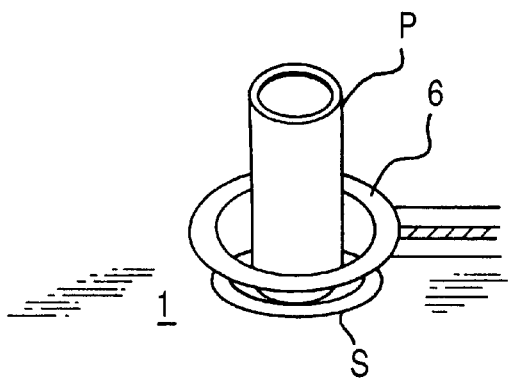
FIG. 11 is a perspective view showing a state in which a pipe is soldered to a fuel tank.

Next, with respect to the relationships between heating electric power in soldering and temperatures of a soldered portion (point, A) and a plated portion (point B) in FIG. 6, the case in which the pipe cooled by the method of (a-1) and the case in which it was not cooled were examined. The results are shown in FIG. 8. As is apparent from FIG. 8, when the heating temperature is below 340° C., incomplete penetration of solder occurs. Thus, in order to raise the temperature at point A to 340° C. or more, it is necessary that the electric power for heating be 1.6 kW or more, irrespective of the performance of cooling. In contrast, when the heating temperature exceeds 500° C., thermal degradation of plating occurs. Thus, it is necessary that the electric power for heating be 1.7 kW or less in the case of non-cooling. Therefore, in the case of non-cooling, as shown in FIG. 9, the electric power for heating must be controlled ranging from 1.6 to 1.7 kW, that is, within a range of 0.1 kW.

In contrast, the temperature at point B after cooling is not very rapidly increased relative to the increase of the electric power for heating, as shown in FIG. 8. Thus, a temperature at point B can be lowered to 500° C. or less, even if the electric power for heating is raised to about 1.9 kW. Therefore, in the case of cooling, as shown in FIG. 9, the electric power for heating may be controlled ranging from 1.6 to 1.9 kW, that is, within the range of 0.3 kW. This is very important in order to stabilize the qualities. That is, in the case of soldering, a target temperature by heating must be controlled at a level which is similar to the lower limit, since the prevention of heat degradation at plated portions has been regarded as important for some time. However, when the allowable range of heating temperature is narrow, incomplete penetration of the solder easily occurs due to variation of heating temperature, since the temperature at soldered portion (point A) fluctuates greatly depending on the distance between an electrode and solder, even if the electric power is the same. In contrast, according to the present invention, since the allowable range of heating temperature is broadened by cooling, the dispersion of heating temperature of the solder can be absorbed, and the qualities can be stabilized even by simple control.

Additionally, the present invention is not limited to such a structure comprising a fuel tank and a pipe, and it can be applied to any connection structures for metallic components.

As explained above, according to the present invention, the heat degradation of plating and the contact corrosion between solder and plating can be prevented, solderability can be improved, and qualities such as the corrosion resistance and connecting strength at the connection structure can be improved, since Sn—Zn alloy is plated on at least one of first and second metallic members and Sn—Ag alloy is used as a solder.

What is claimed is:

1. A connection structure for metallic members in which a first metallic member and a second metallic member are connected by solder, wherein Sn—Zn alloy is plated on at least one of said first metallic member and said second metallic member, and said solder consists of Sn—Ag alloy.

2. A connection structure for metallic members as recited in claim 1, wherein said solder and said plated Sn—Zn alloy melt each other so as to form a melted portion, and a Zn-rich layer formed by alloying said solder and said plated Sn—Zn alloy is provided on a surface of said melted portion.

3. A connection structure for metallic members as recited in claim 1, wherein said Sn—Zn alloy plating consists of 93 to 55% by weight of Sn and 7 to 45% by weight of Zn.

4. A connection structure for metallic members as recited in claim 1, wherein said solder consists of 94 to 98% by weight of Sn and 2 to 6% by weight of Ag.

5. A connection structure for metallic members as recited in claim 1, wherein said solder contains at least one of Zn, Cu and Bi, in the total amount of 3% by weight or less.

6. A connection structure for metallic members as recited in claim 1, wherein said plated Sn—Zn alloy has a thickness of 3 to 13 $\mu$m.

7. A connecting method for a connection structure for metallic members, comprising:

plating Sn—Zn alloy on at least one of a first metallic member and a second metallic member;

using Sn—Ag alloy as solder; and connecting said first metallic member and said second metallic member by said solder while cooling the connected portion.

8. A connecting method for a connection structure for metallic members as recited in claim 7, further comprising:

forming a melted portion by melting said solder and said plated Sn—Zn alloy with each other; and forming a Zn-rich layer on a surface of said melted portion by alloying said solder and said plated Sn—Zn alloy.

9. A connecting method for a connection structure for metallic members as recited in claim 7, wherein said Sn—Zn alloy plating consists of 93 to 55% by weight of Sn and 7 to 45% by weight of Zn.

10. A connecting method for a connection structure for metallic members as recited in claim 7, wherein said solder consists of 94 to 98% by weight of Sn and 2 to 6% by weight of Ag.

11. A connecting method for a connection structure for metallic members as recited in claim 7, wherein said solder contains at least one of Zn, Cu, and Bi, in a total amount of 3% by weight or less.

12. A connecting method for a connection structure for metallic members as recited in claim 7, wherein said plated Sn—Zn alloy has a thickness of 3 to 13 $\mu$m.

13. A connecting method for a connection structure for metallic members as recited in claim 7, wherein said first metallic member is a container and said second metallic member is a pipe.

14. A connecting method for a connection structure for metallic members as recited in claim 13, wherein said pipe is cooled by flowing coolant in the inside thereof.

15. A connecting method for a connection structure for metallic members as recited in claim 13, wherein said pipe is cooled by spraying coolant in the external surface thereof.

16. A connecting method for a connection structure for metallic members as recited in claim 13, wherein said pipe is cooled by providing radiating members at an end thereof.

* * * * *